(12) United States Patent
Yang

(10) Patent No.: US 7,215,981 B2
(45) Date of Patent: May 8, 2007

(54) FOLDER TYPE MOBILE PHONE

(75) Inventor: Kyung-Tae Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 288 days.

(21) Appl. No.: 10/920,654

(22) Filed: Aug. 17, 2004

(65) Prior Publication Data

US 2005/0054396 A1 Mar. 10, 2005

(30) Foreign Application Priority Data

Aug. 22, 2003 (KR) ............ 10-2003-0058421

(51) Int. Cl.
*H04B 1/38* (2006.01)
(52) U.S. Cl. ............... 455/575.3; 379/433.13
(58) Field of Classification Search ............ 455/550.1, 455/566, 575.1, 575.3; 379/433.01, 433.13; 348/376
See application file for complete search history.

(56) References Cited

U.S. PATENT DOCUMENTS

| 5,873,554 A * | 2/1999 | Nobuchi | 248/278.1 |
| 6,549,789 B1 * | 4/2003 | Kfoury | 455/550.1 |
| 6,965,413 B2 * | 11/2005 | Wada | 348/376 |
| 2003/0228847 A1 * | 12/2003 | Matsumoto | 455/90.3 |
| 2004/0198474 A1 * | 10/2004 | Jung et al. | 455/575.1 |
| 2006/0058079 A1 * | 3/2006 | Goto | 455/575.3 |
| 2006/0116157 A1 * | 6/2006 | Takamori et al. | 455/550.1 |

FOREIGN PATENT DOCUMENTS

| JP | 10-285444 | 10/1998 |
| JP | 2001-227229 | 8/2001 |
| JP | 2002-139020 | 5/2002 |
| JP | 2003-133764 | 5/2003 |
| KR | 1020030037886 A | 5/2002 |
| KR | 1020030030619 A | 4/2003 |
| KR | 1020030047395 A | 6/2003 |
| KR | 1020030055861 A | 7/2003 |

* cited by examiner

*Primary Examiner*—Nguyen T. Vo
(74) *Attorney, Agent, or Firm*—Lee, Hong, Degerman, Kang & Schmadeka P.C.

(57) ABSTRACT

A folder type mobile having a main body and a folder coupled to each other through a hinge coupling section, the hinge coupling section comprising a first hollow cylinder for rotating the folder in a first direction, a second hollow cylinder coupled to a side surface of the first hollow cylinder for rotating the folder in a second direction, a dummy hinge shaft located in the first hollow cylinder, and a rotational shaft located in the second hollow cylinder, the rotational shaft engaging the dummy hinge shaft and capable of being rotated in the second direction when the rotational shaft is rotated in the first direction about the dummy hinge shaft at an angle in a predetermined angle range.

22 Claims, 9 Drawing Sheets

FOLDER TYPE MOBILE PHONE

CROSS-REFERENCE TO RELATED APPLICATIONS

Pursuant to 35 U.S.C. § 119(a), this application claims the benefit of earlier filing date and right of priority to Korean Application No. 2003-0058421, filed on Aug. 22, 2003, the contents of which are hereby incorporated by reference herein in their entirety.

BACKGROUND OF THE INVENTION

1. Field of the Invention

The present invention relates to a folder type mobile phone in which a folder and a main body are coupled to a two-way rotational hinge, and more specifically, to a mobile phone in which a folder can be rotated horizontally only when the folder is opened about a main body in a predetermined angle range.

2. Description of the Related Art

Conventional hinge structures of mobile phones are disclosed in Korean Unexamined Patent Publication No. 2002-55861, published on Jul. 10, 2002, and Korean Utility Model Publication No. 0258170, published on Dec. 29, 2001.

Patent Publication 2002-55861 discloses a mobile phone comprising a main body case and a folder case, wherein a hinge structure for coupling the main body case and the folder case to each other comprises a hinge body supported by the main body case to be rotated, a hinge axis formed in the hinge body, a hinge hole formed in the folder case and the hinge axis, a click spring coupled between the hinge axis and the hinge hole to prevent the folder case from being rapidly rotated, a guide groove for setting a guide angle and a rotational angle, the guide groove formed in an arc shape around the hinge hole of the folder case, a rotation sensing switch for sensing the rotation of the folder, and a display window provided on a surface of the folder case and exposed selectively to the inside or outside of the mobile phone.

Utility Model Publication 0258170 discloses a mobile phone comprising a main body and a cover, wherein a cover hinge mechanism for the mobile phone comprises a housing inserted into a hinge section of the cover not to be rotated, a sliding cam inserted into the housing not to be rotated but to be axially moved, the sliding cam having an uneven-shaped cam surface corresponding to the opening and closing of the cover, a shaft which is inserted into the sliding cam to be rotated and slid, and of which an end is fixed to the hinge section of the main body not to be rotated, a sliding pin inserted into an axis of the shaft, such that both ends thereof are protruded and the uneven cam surface of the sliding cam slides on the protruded portions, and a pressing spring provided on the shaft of the housing to elastically press the sliding cam toward the sliding pin.

Generally, in a folder type mobile phone having a two-way rotational hinge, as shown in FIG. 1, a folder 10 and a main body 20 are coupled to each other through a two-way rotational hinge. The hinge comprises a horizontal hinge 40 used for opening and closing the folder 10 about the main body 20, and a vertical hinge 30 having a rotational axis perpendicular to the rotational axis of the horizontal hinge, where the two hinges are coupled to each other.

The folder 10 is rotated in a direction in which the folder 10 is opened and closed about the main body 20 by using the horizontal hinge 40 as a rotational axis. When the folder 10 is opened from the main body 20, the folder 10 can be rotated horizontally by using the vertical hinge 30 as a rotational axis.

There is no problem when the folder 10 is opened to be perpendicular to a keypad plane of the main body 20 and then is rotated horizontally in this state. However, when the folder 10 is rotated horizontally in a state where the folder 10 is not perpendicular to the keypad plane, edges of the folder case may collide with the keypad or an exposed antenna 50 protruding from and upper end of the main body 20. As a result, the exposed antenna 50 may be damaged, or the key buttons of the keypad may be destroyed.

SUMMARY OF THE INVENTION

The present invention is related to a folder type mobile phone wherein objects on a main body of the phone, such as an antenna or key buttons of a keypad, are prevented from being damaged by a folder capable of being rotated horizontally.

It is an object of the present invention to provide a folder type mobile phone of which a folder and a main body are coupled to each other through a hinge, wherein the folder itself can be rotated only when the folder is opened about the main body at an angle within a predetermined angle range.

According to an aspect of the present invention, there is provided a folder type mobile phone of which a main body and a folder are coupled to each other through a hinge coupling section, the coupling section comprising a first hollow cylinder for rotating the folder in a first direction and a second hollow cylinder coupled to a side surface of the first hollow cylinder for rotating the folder in a second direction, a dummy hinge shaft located in the first hollow cylinder and fixed to the main body, and a rotational shaft located in the second hollow cylinder and fixed to the folder, the rotational shaft engaging the dummy hinge shaft and capable of being rotated in the second direction when the rotational shaft is rotated in the first direction about the dummy hinge shaft at an angle in a predetermined angle range.

In another aspect, there is provided a folder type mobile phone comprising a main body, a folder, and a hinge coupling section for coupling the main body to the folder, the hinge coupling section allowing the folder to rotate about the main body in a first direction, the hinge coupling section allowing the folder to rotate in a second direction perpendicular to the first direction when the folder is rotated about the main body in the first direction at an angle in a predetermined angle range.

The foregoing and other objects, features, aspects and advantages of the present invention will become more apparent from the following detailed description of the preferred embodiments when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Figure 1:
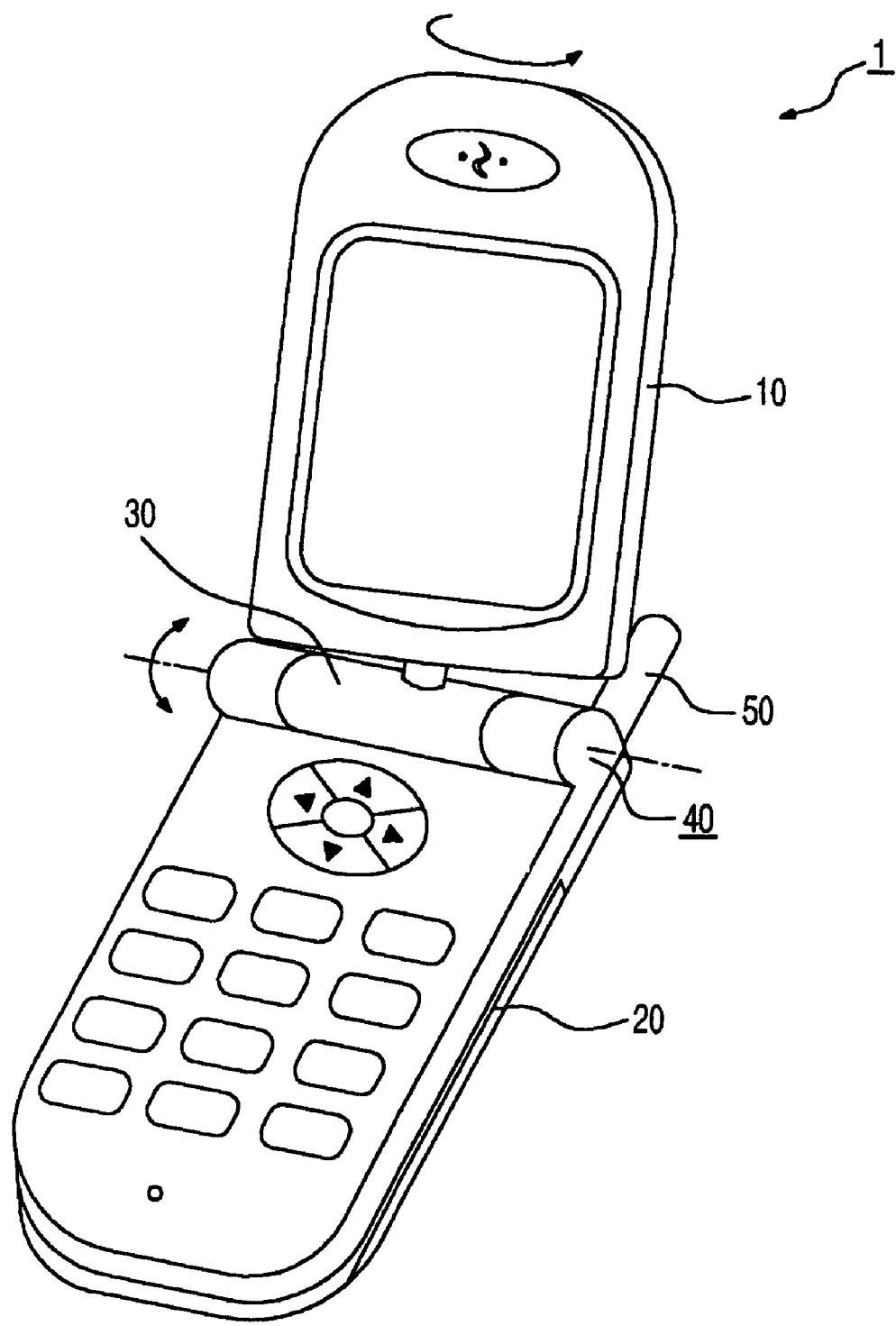
FIG. 1 is a perspective view illustrating a folder type mobile phone having a conventional two-way rotational hinge.
Figure 2:
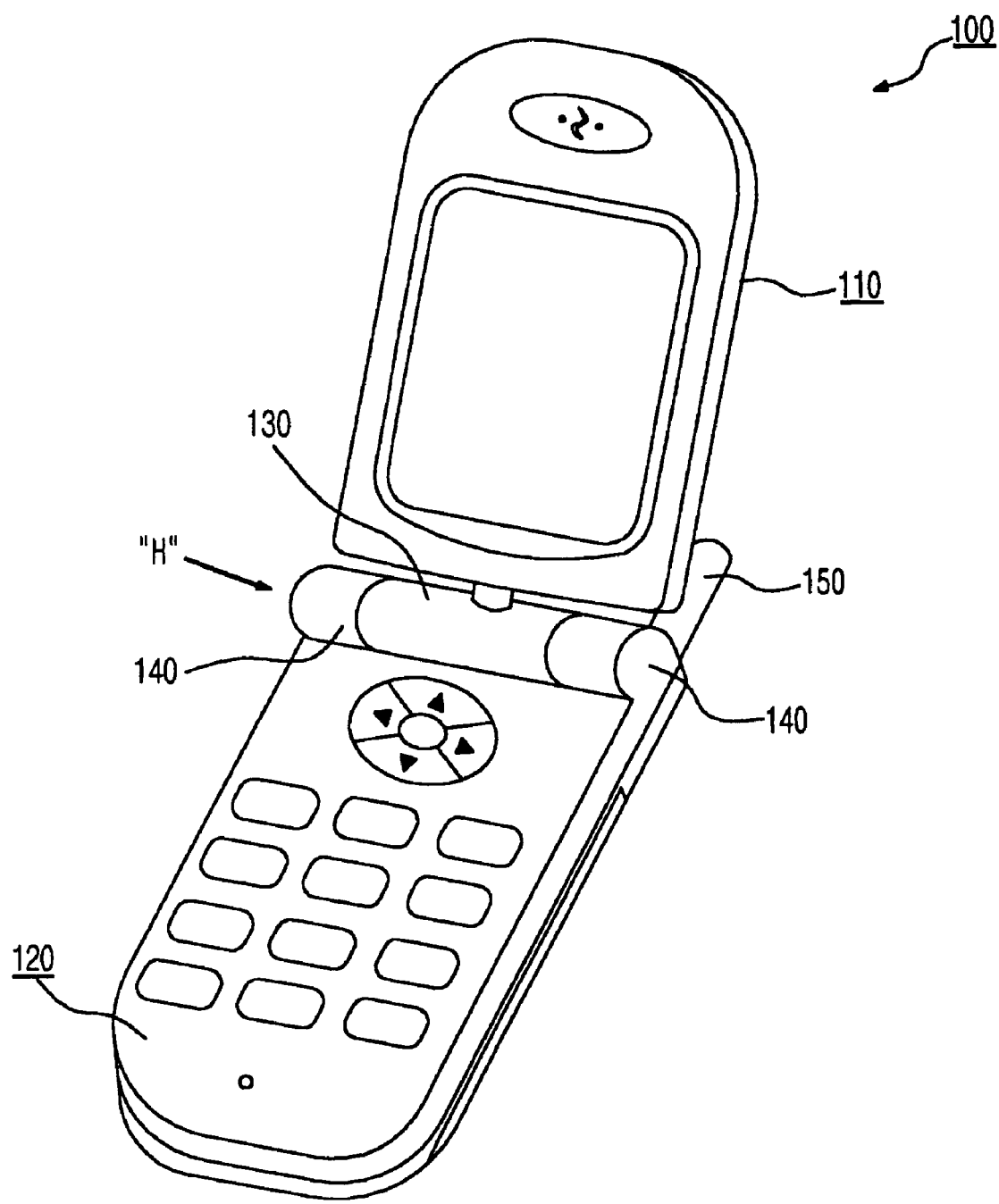
FIG. 2 is a perspective view illustrating an opened state of a folder type mobile phone having a two-way rotational hinge according to an embodiment of the present invention.

A folder type mobile phone according to an embodiment of the present invention comprises, as shown in FIG. 2, a folder 110, a main body 120 and a hinge coupling section "H" for coupling the main body 120 and folder 110 such that the folder 110 can be rotationally opened and closed about the main body 120. An exposed antenna 150 of a predetermined height protrudes from one side of a top end of the main body 120.

Figure 3:
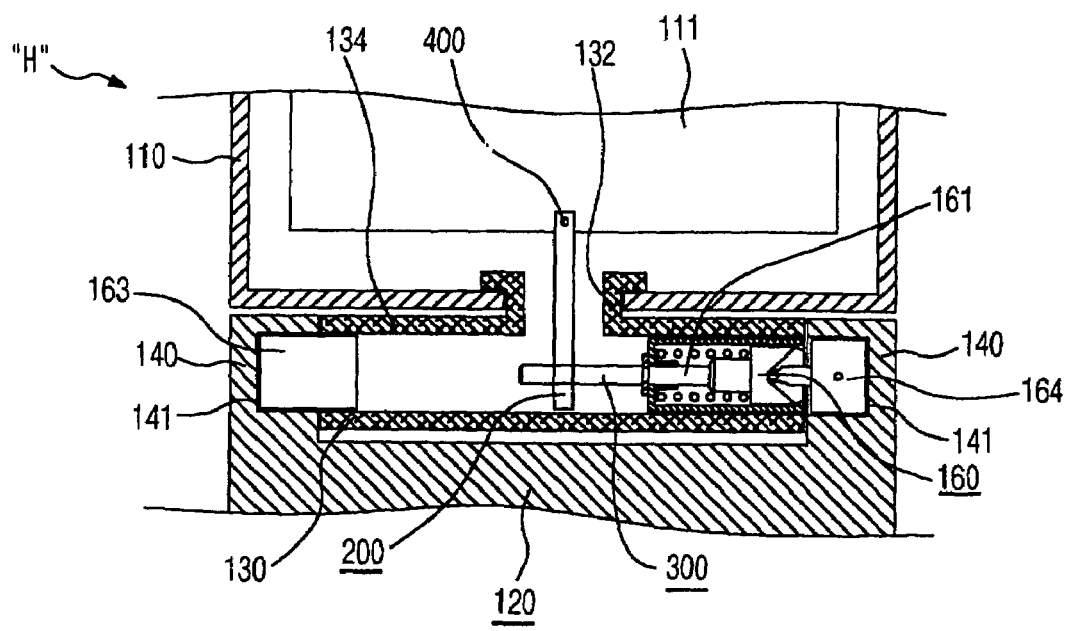
FIG. 3 is cross-sectional view illustrating a hinge coupling section of the folder type mobile phone having the two-way rotational hinge according to an embodiment of the present invention.

The hinge coupling section "H", as shown in FIG. 3, has two side hinge arms 140, a hinge body 130 and a hinge mechanism 160.

The two hinge arms 140 are provided with a predetermined horizontal gap at the top end of the main body 120. Side surfaces opposite to each other of the hinge coupling section "H" are provided with hinge grooves 141.

The hinge body 130 comprises a first hollow cylinder 134 for rotating in a first direction in which the folder 110 is opened and closed about the main body 120. The hinge grooves 141 formed in the two side hinge arms 140 receive hinge axes 163, 164 allowing the hinge body 130 to rotate about a first hinge axis in the first direction. The hinge body 130 further comprises a second hollow cylinder 132 coupled to a side surface of the first hollow cylinder 134 at a position perpendicular to the first hinge axis. The second hollow cylinder 132 functions as a rotational axis for rotating the folder 110 in a second direction about a second hinge axis perpendicular to the first hinge axis wherein an inner space of the first hollow cylinder 134 communicates with an inner space of the second hollow cylinder 132.

The hinge mechanism 160 is provided at an inner circumferential side portion of the hinge body 130 at a hinge groove 141. The hinge mechanism 160 opens and closes the folder 110 according to a predetermined angle with an elastic force.

As shown in FIG. 3, the hinge body 130 is preferably formed from the interconnection of the first hollow cylinder 134 and the second hollow cylinder 132. More specifically, the first hollow cylinder 134 is coupled to hinge axes 163, 164 of the side hinge arms 140 formed in the main body 120 and is rotated about a first hinge axis in a first direction in which the folder 110 is opened and closed about the main body 120. The second hollow cylinder 132 is coupled to the side surface of the first hollow cylinder 134 perpendicular to the first hinge axis wherein the inner space of the second hollow cylinder 132 communicates with the inner space of the first hollow cylinder 134.

The folder 110 is coupled to the second hollow cylinder 132 so that the folder 110 can be rotated in the second direction about the second hinge axis perpendicular to the first hinge axis. Therefore, the second hollow cylinder 132 functions as a rotational axis for rotating the folder 110.

A dummy hinge shaft 300 fixed to one side hinge arm 140 formed in the main body 120 is provided in the inner space of the first hollow cylinder 134. A rotational shaft 200 coupled integrally to the folder 110 is provided in the inner space of the second hollow cylinder 132. Preferably, one end of the rotational shaft 200 is fixed to the folder 110 while the other end is coupled to an end of the dummy hinge shaft 300 so that the folder 110 can be rotated in the second direction only when the folder 110 is opened in the first direction about the main body 120 at an angle within a predetermined angle range.

The dummy hinge shaft 300 and the rotational shaft 200 are coupled as shown in FIGS. 3 to 11. Preferably, the dummy shaft 300 and the rotational shaft 200 share a coupling space. When the coupling space is occupied with the dummy hinge shaft 300, the rotational shaft 200 can be rotated only in the first direction about the dummy hinge shaft 300. When the coupling space is occupied with the rotational shaft 200, the rotational shaft 200 can be rotated in the second direction. The shared coupling space can be occupied by only one shaft at a time.

As shown in FIGS. 4, 6, 8 and 9, cavities formed in the shafts create the coupling space which the rotational shaft 200 and dummy hinge shaft 300 share. Preferably, a first reception cavity 310 for receiving an outer circumferential portion of the rotational shaft 200 is formed in the dummy hinge shaft 300 and second reception cavities 210, 220 for receiving an outer circumferential portion of the dummy hinge shaft 300 are formed in the rotational shaft 200.

As a result, when the dummy hinge shaft 300 is received in the second reception cavities 210, 220 of the rotational shaft 200, the rotational shaft 200 can be rotated in the first direction about the dummy hinge shaft 300. When the rotational shaft 200 is received in the first reception cavity 310 of the dummy hinge shaft 300, the rotational shaft 200 can be rotated in the second direction about its own rotational axis.

Figure 4:
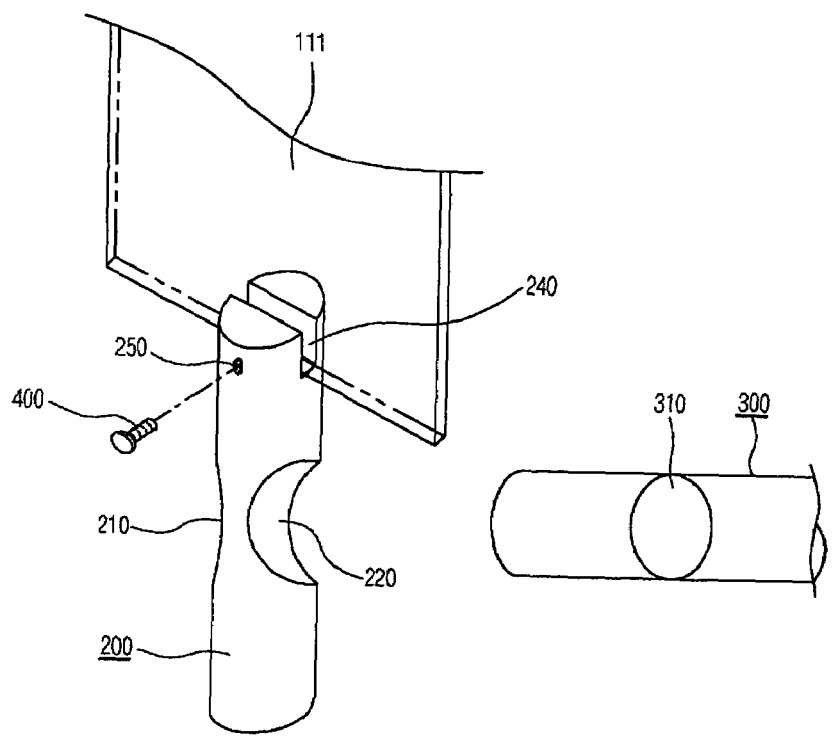
FIG. 4 is a perspective view illustrating a rotational shaft and a dummy hinge shaft according to an embodiment of the present invention.

As shown in FIG. 4, the second reception cavities 210, 220 are formed at positions symmetrical about the second rotational axis. FIG. 4 further shows the rotational shaft 200 being fixed to the folder 110. Such is accomplished by forming a fixing groove 240 and a screw groove 250 in the rotational shaft 200, thus allowing the shaft 200 to couple onto a case coupling portion 111 of the folder 110 via a fixing screw 400. It is noteworthy that other functional and structural equivalents may be employed to couple the rotational shaft 200 to the folder 110. Thus, the present invention is not limited to this example, but may employ various coupling means.

The first reception cavity 310 of the dummy hinge shaft 300 and the second reception cavities 210, 220 of the rotational shaft 200 constitute the coupling space shared during the coupling of the two shafts. Therefore, the two shafts are closely coupled to each other such that the coupling space can be occupied with only one shaft.

Preferably, the positions of the shafts are such that the first reception cavity 310 and the second reception cavities 210, 220 are located at the positions where the rotational shaft 200 can be rotated in the second direction when the folder is opened by approximately 90° about the main body 120. Moreover, the shafts are perpendicular to each other in the inner space of the hinge body 130 such that the folder 110 is rotationally opened and closed about the main body 120 and is rotationally inverted only when the angle between the folder 110 and the main body 120 reaches a predetermined angle such as 90°, thereby changing the positions of the front surface and the back surface of the folder 110. Two cavities formed in the rotational shaft 200 preferably have a circular diameter larger than the diameter of the dummy hinge shaft 300. It is noteworthy that the sizes of the cavities shown in the figures are not substantially proportional to the actual sizes.

Figure 5:
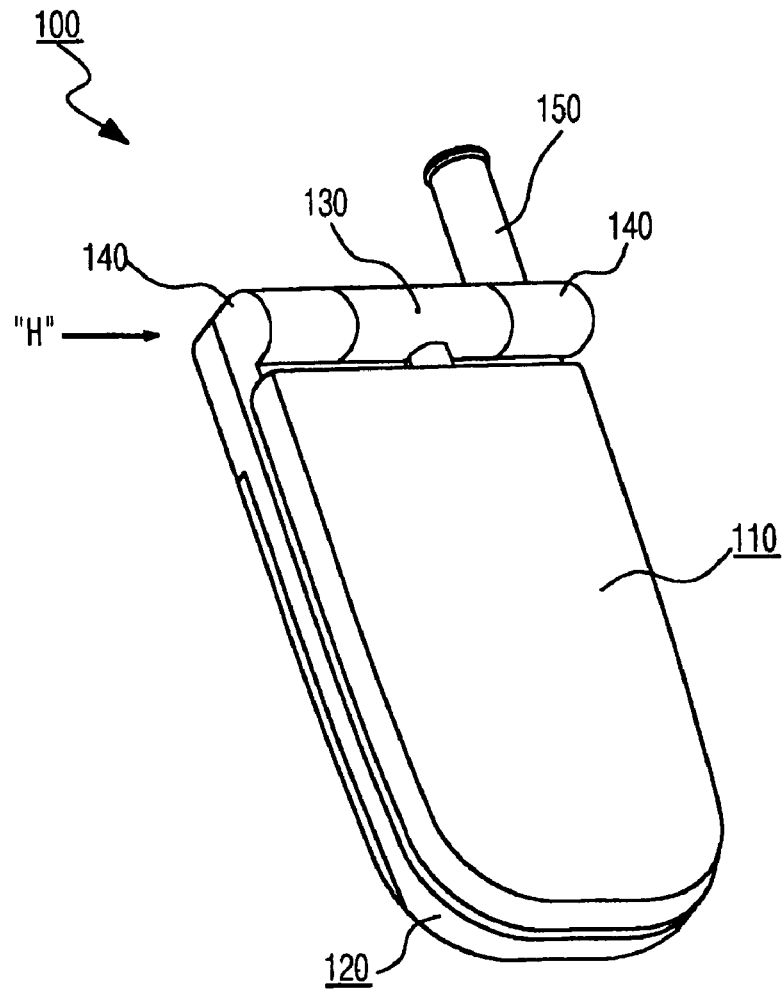
FIG. 5 is a perspective view illustrating a closed state of the folder type mobile phone having the two-way rotational hinge according to an embodiment of the present invention.
Figure 6:
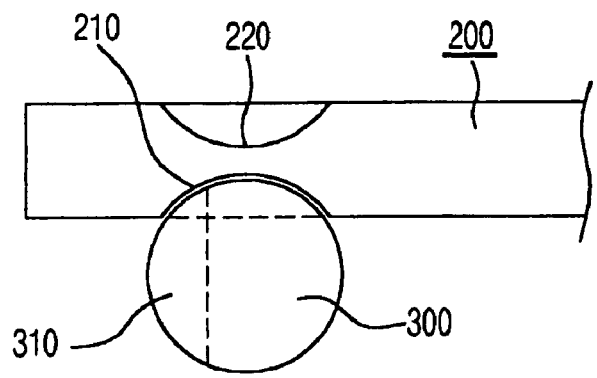
FIG. 6 is perspective view illustrating a state where the rotational shaft and the dummy hinge shaft are perpendicular to each other under the state shown in FIG. 5.

As shown in FIGS. 5 and 6, when the folder 110 is closed about the main body 120, the rotational shaft 200 and the dummy hinge shaft 300 are crossed orthogonally, where the outer circumferential portion of the dummy hinge shaft 300 passes through the second reception cavity 210 of the rotational shaft 200. At this time, the first reception cavity 310 is at a position having a phase difference of approximately 90° from the position of the second reception cavity 210.

Figure 7:
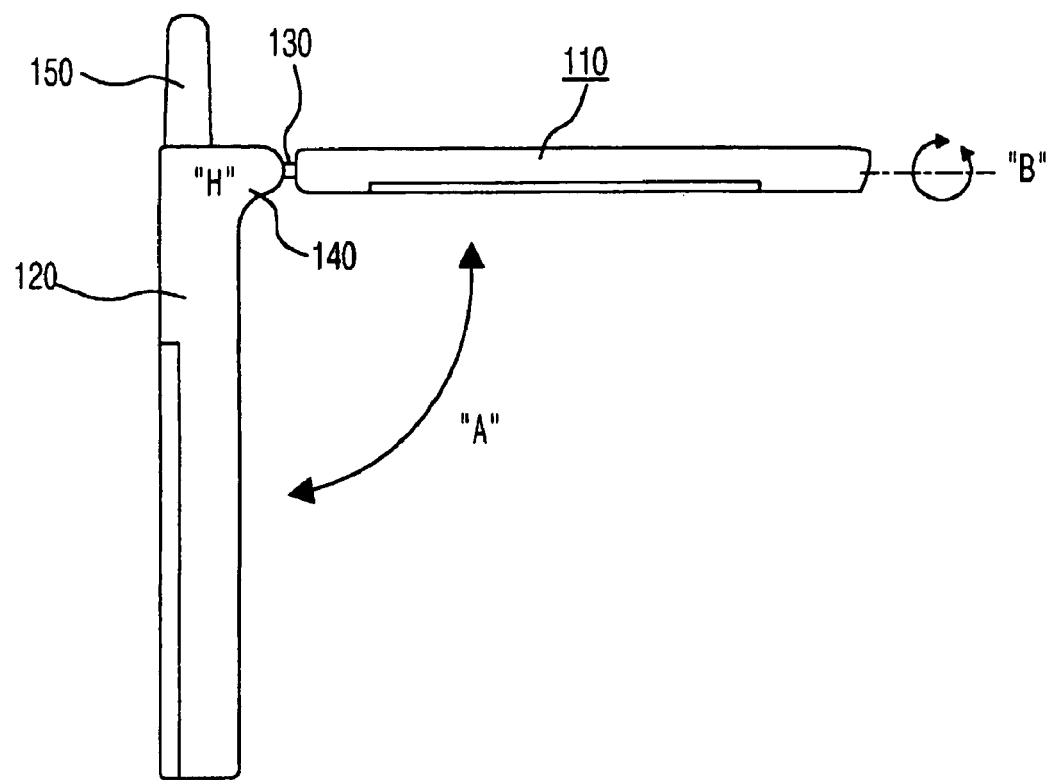
FIG. 7 is a side view illustrating a state where the folder is opened by 90° about the folder type mobile phone having the two-way rotational hinge according to an embodiment of the present invention.
Figure 8:
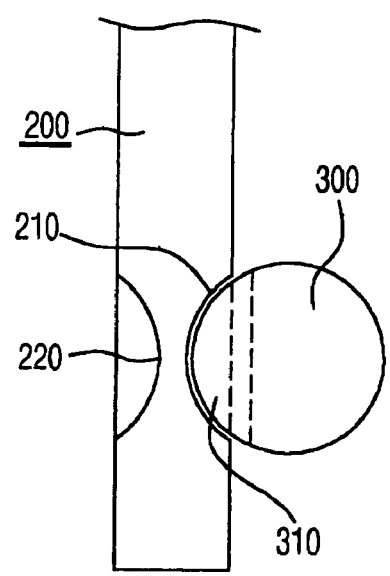
FIG. 8 is a schematic view illustrating a state where the rotational shaft and the dummy hinge shaft are perpendicular to each other under the state shown in FIG. 7.
Figure 9:
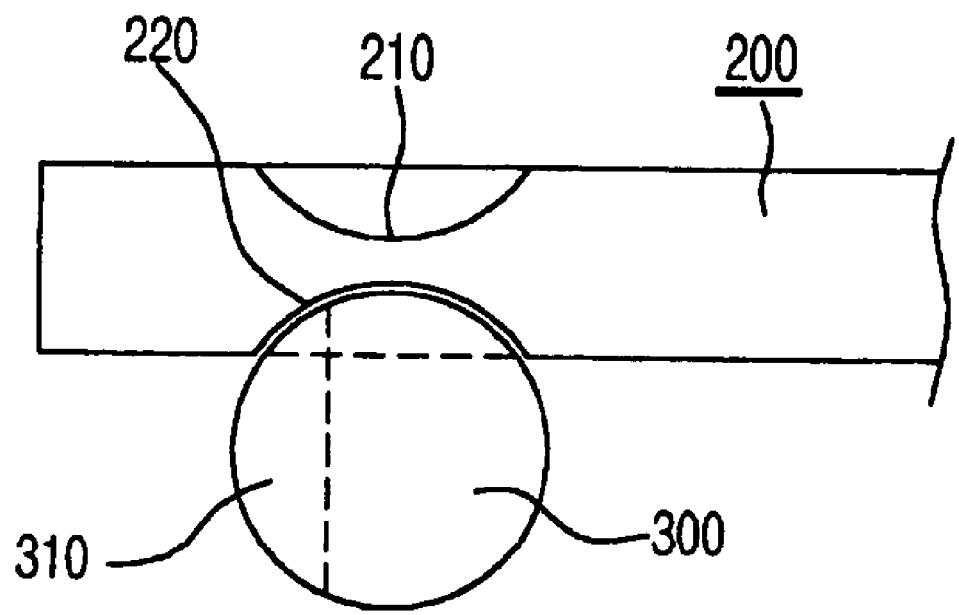
FIG. 9 is a schematic view illustrating a state where the rotational shaft and the dummy hinge shaft are perpendicular to each other under the state where the folder is rotationally inverted as indicated by an arrow "B" in FIG. 7.

When the folder 110 is rotated vertically by approximately 90° about the main body 120 as indicated by an arrow "A" in FIG. 7, the second reception cavity 210 of the rotational shaft 200 reaches substantially the same position as the first reception cavity 310 of the dummy hinge shaft 300, as shown in FIG. 8. Preferably, it is only in this state that the folder 110 can be rotated horizontally as indicated by an arrow "B" in FIG. 7. As shown in FIG. 9, when the folder 110 is horizontally rotated by approximately 180°, the second reception cavity 220 of the rotational shaft 200 faces the first reception cavity 310 of the dummy hinge shaft 300.

Figure 10:
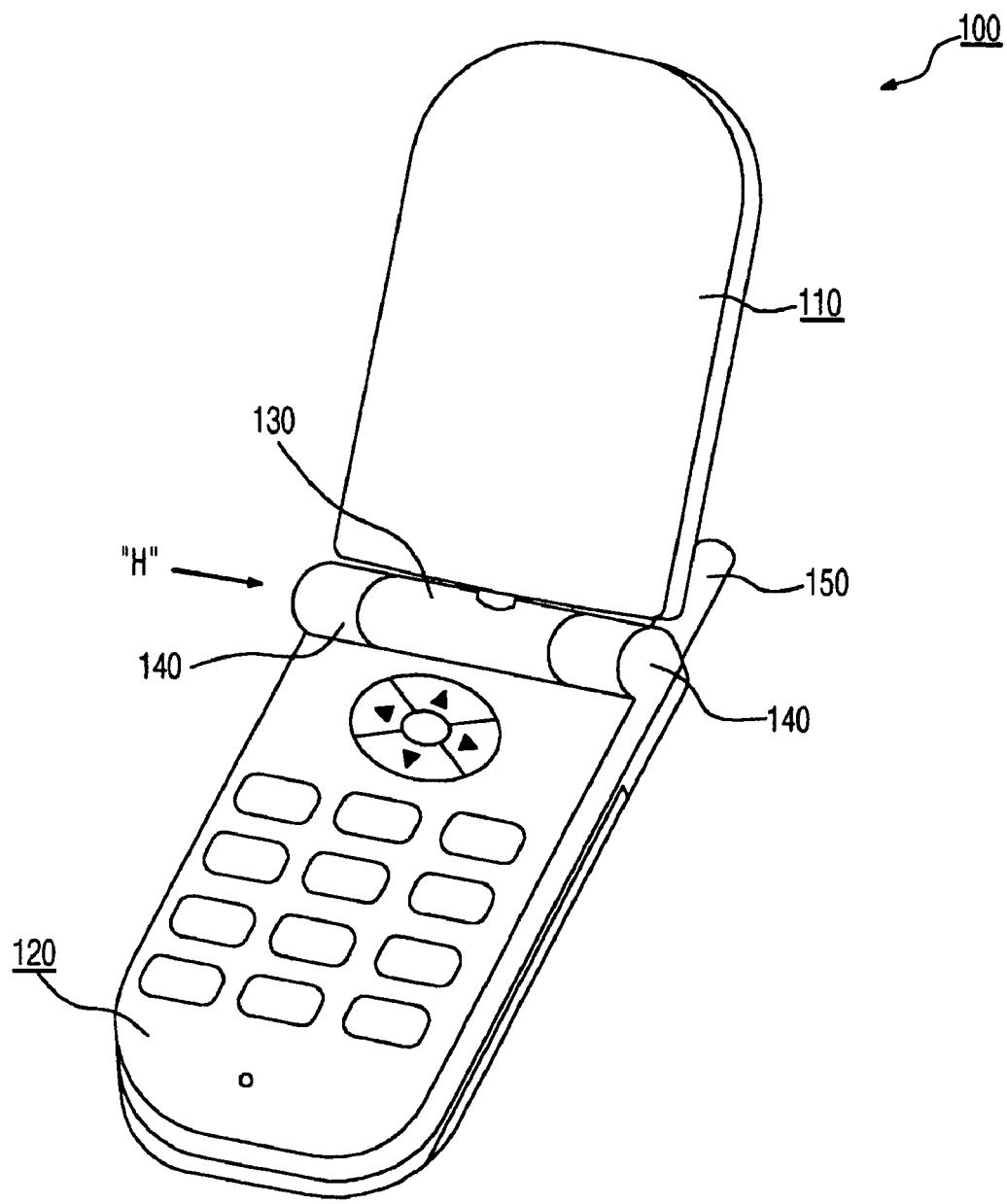
FIG. 10 is a perspective view illustrating a state where the folder is completely opened under its inverted state in the folder type mobile phone having the two-way rotational hinge according to an embodiment of the present invention.

As shown in FIG. 10, the front surface and the back surface of the folder 110 are inverted when the second reception cavity 220 faces the first reception cavity 310. By further rotating vertically the folder 110 as indicated by the arrow "A" in FIG. 7, the folder 110 can be completely opened to approximately 160° about the main body 120 with the front surface and the back surface of the folder inverted.

Figure 11:
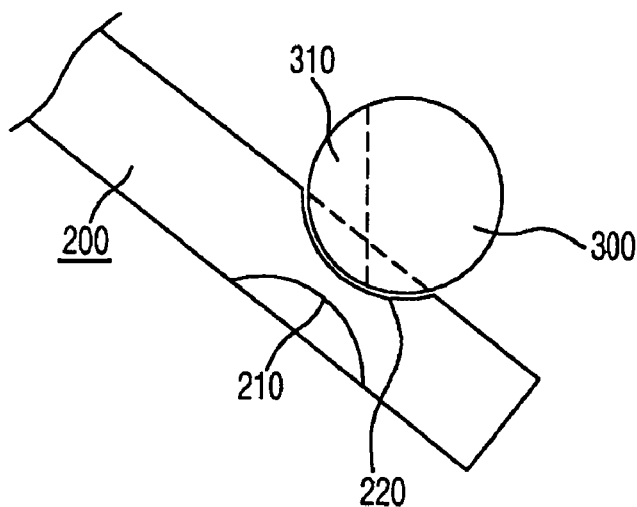
FIG. 11 is a schematic view illustrating a state where the rotational shaft and the dummy hinge shaft are perpendicular to each other under the state shown in FIG. 10.

As shown in FIG. 11, when the folder 110 is completely opened, the outer circumferential portion of the dummy hinge shaft 300 is inserted into the second reception cavity 220 of the rotational shaft 200. In this state, the folder 110 cannot be rotated horizontally as indicated by the arrow "B" in FIG. 7.

Therefore, because it is preferred that the front surface and the back surface of the folder 110 be rotationally inverted only when the folder 110 is opened by approximately 90° about the main body 120, an exposed antenna 150 protruding from one side of the top end of the main body 120 will not hinder the rotation of the folder 110. Further, other portions of the main body 120, such as the keypad, will not come into contact with the folder.

Significantly, the folder 110 can also be completely opened to approximately 160° about the main body 120 when the front surface and the back surface of the folder are not inverted. Here, the outer circumferential portion of the dummy hinge shaft 300 is inserted into the second reception cavity 210 of the rotational shaft 200. In this state, the folder 110 cannot be rotated horizontally as indicated by the arrow "B" in FIG. 7.

Figure 12:
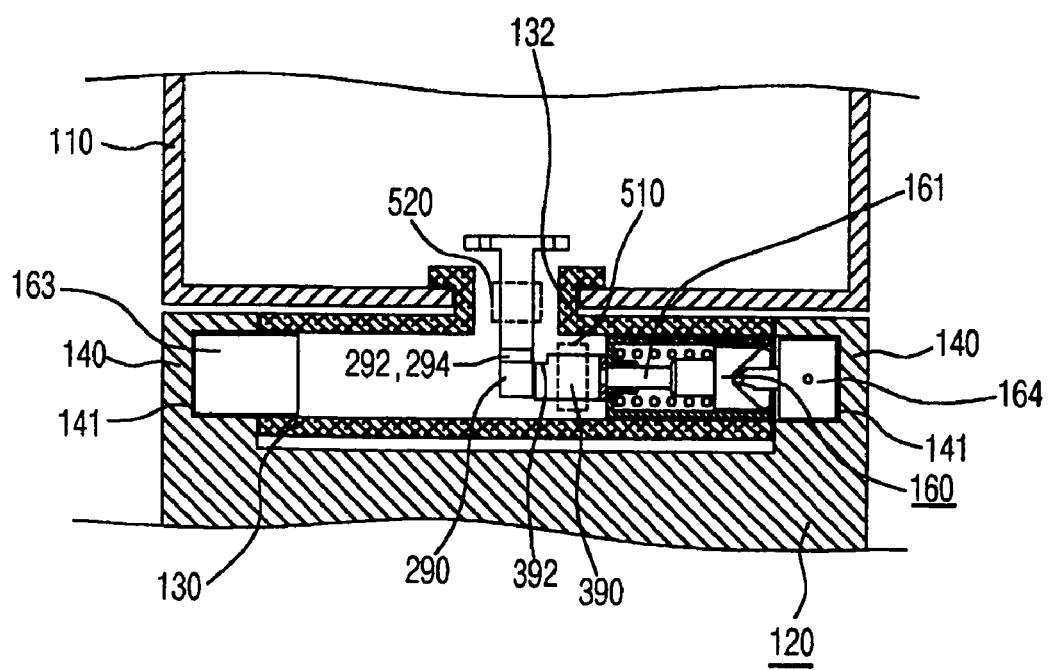
FIG. 12 is a cross-sectional view illustrating the hinge coupling section of a folder type mobile phone having a two-way rotational hinge according to another embodiment of the present invention.
Figure 13:
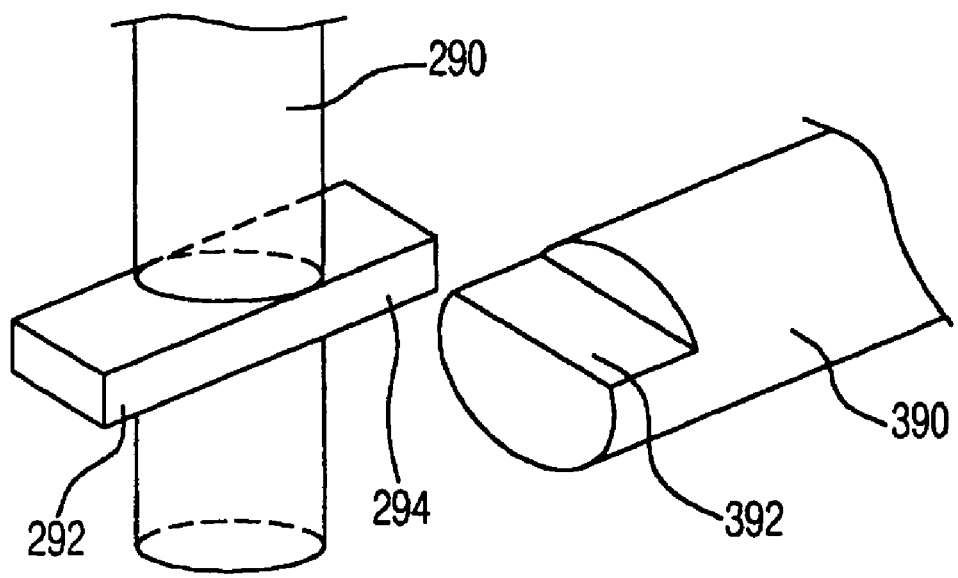
FIG. 13 is a perspective view illustrating separately a protruded portion of the hinge shaft and a cut-out groove of the dummy hinge shaft in FIG. 12.

Referring to FIGS. 12 and 13, another embodiment of the present invention is shown with end portions of the dummy hinge shaft 390 and the rotational shaft 290 having a cam structure. The dummy hinge shaft 390 is provided such that the end thereof is adjacent to an outer circumferential edge of a rotational shaft 290. A cut-out groove 392 is formed in the end portion of the dummy hinge shaft 390.

Protruded portions 292, 294 capable of passing through the cut-out groove 392 of the dummy hinge shaft 390 are formed symmetrically at both sides of the rotational shaft 290. As a result, when the protruded portion 294 of the rotational shaft 290 reaches a position in which the protruded portion 294 passes through the cut-out groove 392 of the dummy hinge shaft 390, the rotational shaft 290 can be rotated in the second direction.

When the protruded portions 292, 294 of the rotational shaft 290 are located in a position in which the protruded portions 292, 294 do not pass through the cut-out groove 392 of the dummy hinge shaft 390, such as when the protruded portions 292, 294 collide with the end portion of the dummy hinge shaft 390, the rotational shaft 290 cannot be rotated in the second direction, but can be rotated in the first direction.

Figure 14:
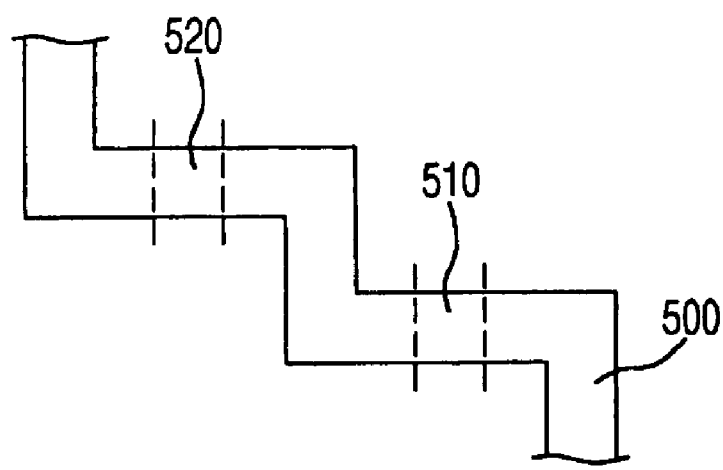
FIG. 14 is a plan view illustrating a flexible printed circuit (FPC) for transmitting electrical signals used in the hinge coupling section according to an embodiment of the present invention.

As shown in FIG. 14, a bundle of wires used for connecting electronic circuits of the folder and the main body to transmit and receive signals employs a flexible printed circuit (FPC) 500. The FPC 500 is a set of wires formed in a flexible thin band shape, which is wound around the rotational shaft and the dummy hinge shaft. The FPC 500 is formed such that the wires will not deteriorate and short-circuit even when the FPC 500 is repeatedly wound up and off with the rotation of the shafts. Ends of the FPC 500 are connected to the electronic circuits of the main body and the folder. Portions 510 and 520 are to be wound around the shafts. Preferably, the rotational shaft and the dummy hinge shaft each have a reel portion for winding up and off the FPC during rotation of the rotational shaft and the dummy hinge shaft, respectively.

Therefore, since the folder can be rotationally inverted only when the folder is opened by approximately 90° about the main body, it is possible to prevent an exposed antenna or the keys of a keypad from being damaged during the rotational inversion of the folder. Furthermore, since the FPC is wound around the shafts, it also possible to prevent damages due to the repeated rotation of the folder.

While the present invention has been described in detail with regards to several embodiments, it should be appreciated that various modifications and variations may be made in the present invention without departing from the scope or spirit of the invention. In this regard it is important to note that practicing the invention is not limited to the applications described hereinabove.

What is claimed is:

1. A folder type mobile phone having a main body and a folder coupled to each other by a hinge coupling section, the hinge coupling section comprising:
   a first hollow cylinder for rotating the folder in a first direction and a second hollow cylinder coupled to a side surface of the first hollow cylinder for rotating the folder in a second direction;
   a dummy hinge shaft located in the first hollow cylinder and fixed to the main body; and
   a rotational shaft located in the second hollow cylinder and fixed to the folder, the rotational shaft engaging the dummy hinge shaft and capable of being rotated in the second direction when the rotational shaft is rotated in the first direction about the dummy hinge shaft at an angle in a predetermined angle range.

2. The folder type mobile phone according to claim 1, wherein the second direction is perpendicular to the first direction.

3. The folder type mobile phone according to claim 1, wherein the dummy hinge shaft and the rotational shaft share a coupling space.

4. The folder type mobile phone according to claim 3, wherein the coupling space can be occupied by only one shaft at a time.

5. The folder type mobile phone according to claim 4, wherein the rotational shaft can be rotated in the first direction about the dummy hinge shaft when the coupling space is occupied by the dummy hinge shaft.

6. The folder type mobile phone according to claim 4, wherein the rotational shaft can be rotated in the second direction when the coupling space is occupied by the rotational shaft.

7. The folder type mobile phone according to claim 3, wherein the coupling space comprises at least one cavity formed in the rotational shaft and the dummy hinge shaft, respectively.

8. The folder type mobile phone according to claim 7, further comprising:
   a first reception cavity formed in a portion of the dummy hinge shaft for receiving a part of an outer circumferential portion of the rotational shaft; and
   at least one second reception cavity formed in a portion of the rotational shaft for receiving a part of an outer circumferential portion of the dummy hinge shaft;
   the rotational shaft capable of being rotated in the first direction when the dummy hinge shaft is received in the at least one second reception cavity of the rotational shaft;
   the rotational shaft capable of being rotated in the second direction when the rotational shaft is received in the first reception cavity of the dummy hinge shaft.

9. The folder type mobile phone according to claim 8, wherein the at least one second reception cavity comprises two cavities formed symmetrically about an axis of the rotational shaft for rotating the rotational shaft about the dummy hinge shaft at two positions.

10. The folder type mobile phone according to claim 8, wherein the at least one second reception cavity has a diameter larger than a diameter of the dummy hinge shaft.

11. The folder type mobile phone according to claim 8, wherein the first reception cavity and the at least one second reception cavity are formed at positions in which the rotational shaft can be rotated in the second direction when the folder is rotated in the first direction about the main body at an angle in a predetermined angle range.

12. The folder type mobile phone according to claim 1, wherein end portions of the dummy hinge shaft and the rotational shaft have a cam structure.

13. The folder type mobile phone according to claim 12, wherein an end portion of the dummy hinge shaft is formed to be adjacent to an outer circumferential portion of the rotational shaft, a cut-out groove is formed at the end portion of the dummy hinge shaft, and a protruded portion capable of passing through the cut-out groove is formed in the rotational shaft.

14. The folder type mobile phone according to claim 13, wherein the rotational shaft can be rotated in the second direction when the protruded portion of the rotational shaft is positioned to pass through the cut-out groove of the dummy hinge shaft.

15. The folder type mobile phone according to claim 13, wherein the rotational shaft cannot be rotated in the second direction when the protruded portion of the rotational shaft is positioned not to pass through the cut-out groove of the dummy hinge shaft.

16. The folder type mobile phone according to claim 1, wherein the rotational shaft and the dummy hinge shaft each have a reel portion for winding up and off a flexible printed circuit (FPC) during rotation of the rotational shaft and the dummy hinge shaft, respectively.

17. A folder type mobile phone, comprising:
   a main body;
   a folder; and
   a hinge coupling section for coupling the main body to the folder;
   the hinge coupling section allowing the folder to rotate about the main body in a first direction
   and allowing the folder to rotate in a second direction perpendicular to the first direction when the folder is rotated about the main body in the first direction at an angle in a predetermined angle range,
   wherein the hinge coupling section comprises:
   a dummy hinge shaft fixed to the main body; and
   a rotational shaft fixed to the folder, the rotational shaft being coupled to the dummy hinge shaft and capable of being rotated when the rotational shaft and the dummy hinge shaft form an angle in the predetermined angle range.

18. The folder type mobile phone according to claim 17, wherein the dummy hinge shaft and the rotational shaft share a coupling space.

19. The folder type mobile phone according to claim 18, wherein:
   the rotational shaft is capable of being rotated in the first direction about the dummy hinge shaft when the coupling space is occupied by the dummy hinge shaft; and
   the rotational shaft is capable of being rotated in the second direction when the coupling space is occupied by the rotational shaft.

20. The folder type mobile phone according to claim 18, wherein the coupling space comprises at least one cavity formed in the rotational shaft and the dummy hinge shaft, respectively.

21. The folder type mobile phone according to claim 17, further comprising:
- a first reception cavity formed in a portion of the dummy hinge shaft for receiving a part of an outer circumferential portion of the rotational shaft; and
- at least one second reception cavity formed in a portion of the rotational shaft for receiving a part of an outer circumferential portion of the dummy hinge shaft;
- the rotational shaft capable of being rotated in the first direction when the dummy hinge shaft is received in the at least one second reception cavity of the rotational shaft;
- the rotational shaft capable of being rotated in the second direction when the rotational shaft is received in the first reception cavity of the dummy hinge shaft.

22. The folder type mobile phone according to claim 21, wherein the first reception cavity and the at least one second reception cavity are formed at positions in which the rotational shaft can be rotated in the second direction when the folder is rotated in the first direction about the main body at an angle in a predetermined angle range.

* * * * *